Figure 1:
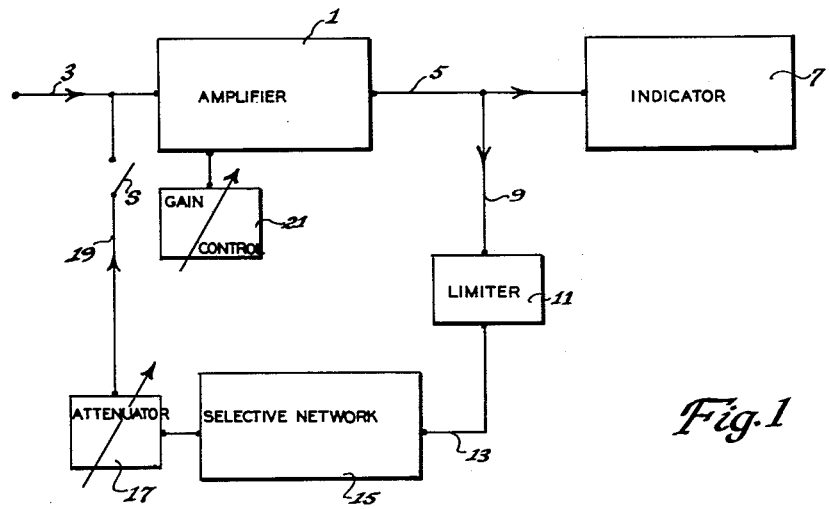

Dec. 5, 1961 A. P. G. PETERSON ET AL 3,012,197
CALIBRATION APPARATUS
Filed Oct. 27, 1958 2 Sheets-Sheet 1

INVENTORS
Arnold P. G. Peterson
BY Ervin E. Gross, Jr.

Rines and Rines
ATTORNEYS

United States Patent Office 3,012,197
Patented Dec. 5, 1961

3,012,197
CALIBRATION APPARATUS

Arnold P. G. Peterson, Weston, and Ervin E. Gross, Jr., Lexington, Mass., assignors to General Radio Company, Cambridge, Mass., a corporation of Massachusetts
Filed Oct. 27, 1958, Ser. No. 769,622
8 Claims. (Cl. 324—130)

The present invention relates to calibration apparatus, and, more particularly, to circuits adapted to calibrate the sensitivity of electronic amplifying systems and to provide for calibration measurements that may be employed to standardize auxiliary equipment employed with such amplifying systems.

Many proposals have heretofore been offered for calibrating the gain or sensitivity of an amplifier system. The present invention, while adapted for use with any type of amplifier system, is particularly advantageous in connection with sound-level meter amplifying equipment. The invention will accordingly be described in connection with this illustrative preferred use, through it is to be understood that the invention is more broadly applicable to other types of amplifying and measuring systems.

In the sound-level meter field, the sensitivity or gain of the instrument must be calibrated in accordance with a predetermined standard. Frequently, a first portion of the mains voltage is compared with a second portion thereof that has been transmitted through the amplifying system, in order to obtain a ratio that may be used as a standardizing reference. There are occasions, however, where the instrument is to be battery-powered, or otherwise operated where it is not convenient to employ the alternating-current mains, or, for that matter, any other source of standardizing voltage. Resort has therefore heretofore been had to providing a self-standardizing circuit embodying a feed-back path between the output and input of the amplifier that sets the amplifier system into oscillation at some adjustment of the gain of the amplifier. The gain adjustment necessary to produce oscillations then serves as a calibration reference point. To a first approximation, the gain of the amplifier system is substantially equal to the loss in the feed-back path, the over-all gain in the oscillation loop being unity.

There are, however, serious difficulties and disadvantageous features involved in such feed-back self-calibrating systems. In the first place, the starting of the oscillations tends to take place near the upper and lower ends of the principal, constant-gain frequency band to which the amplifier has been designed to respond, and not in the constant-gain band region. For this reason, the gain of the amplifier system at the point at which the system goes into oscillation with the aid of the feed-back path, is different from the gain over the constant-gain band. More than this, the point of oscillation in different sound-level instruments will occur at different frequencies, so that there can be no standardization from instrument to instrument. There is also no way of obtaining a reading or measurement of a calibration value that may be employed to standardize an associated instrument, such as, for example, a wave analyzer to be employed with the sound-level meter. This standardization is effected through obtaining a reading on the sound-level meter, and then setting the gain of the wave analyzer so that the wave analyzer reads the same output that the sound-level meter reads in response to the incident sound-pressure wave. This cannot easily be effected with the aid of such prior-art apparatus.

It is desirable, moreover, that the signal at the output of the sound-level meter be substantially a pure sine wave, since the wave analyzer responds to a very narrow frequency band, ideally a single frequency, and therefore requires a substantially pure sine wave in order to effect the necessary standardizing calibration.

It is accordingly an object of the present invention to provide a new and improved calibration apparatus in which all of the above-mentioned disadvantages are overcome. In summary, this result is obtained by insuring that the oscillation produced through the operation of the feed-back path takes place in the flat constant-gain frequency band to which the amplifier system is to respond. The present invention also enables the calibration of the gain at the same point in different instruments. The invention further provides for the obtaining of a calibrating reading which enables the standardization of the gain of associated apparatus, such as the before-mentioned wave analyzer and the like.

A further object is to provide a new and improved sound-level meter.

Other and further objects will be explained hereinafter and will be more fully pointed out in connection with the appended claims.

Figure 2:
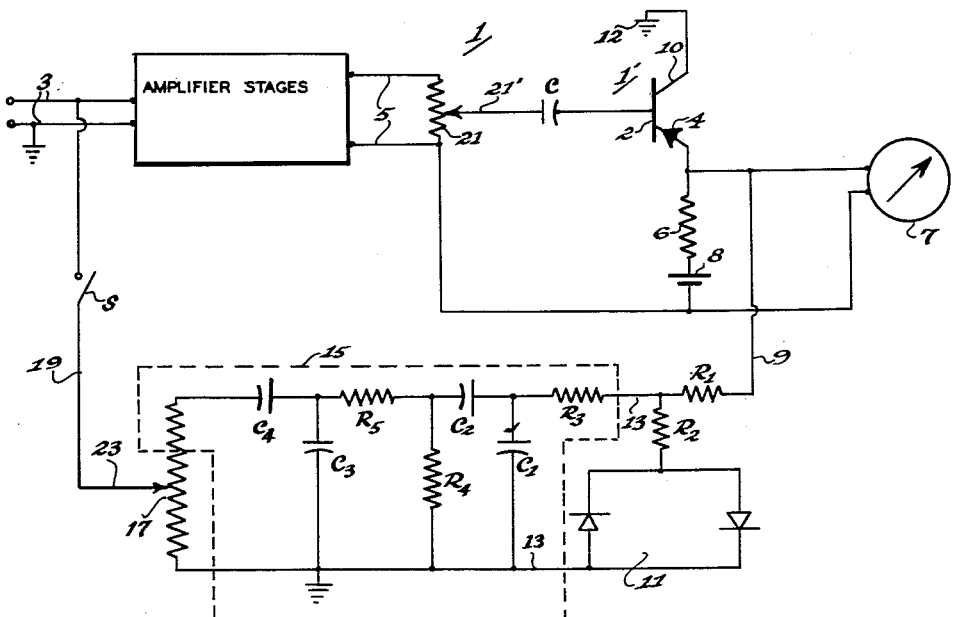
Figure 3:
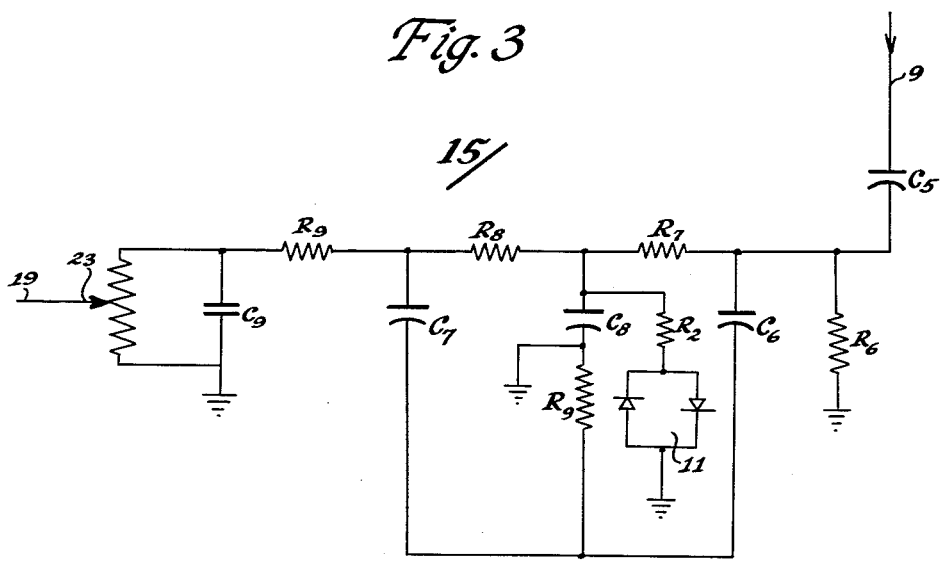

The invention will now be described in connection with the accompanying drawing, FIG. 1 of which is a block diagram illustrating an amplifier system embodying features of the present invention;

FIG. 2 is a circuit diagram of a preferred circuit particularly adapted for use in sound-level meters and the like; and FIG. 3 is a similar circuit diagram of a modification.

Referring to FIG. 1, an amplifier of any desired type is shown at 1 provided with an input circuit 3 and an output circuit 5 and a conventional gain control 21. In the before-mentioned preferred application of the invention to sound-level meters, the input 3 may be connected to a microphone or other pick-up device, not shown, for receiving sound waves. In the output circuit 5, an indicator 7 is shown for a purpose later explained. The amplifier is connected to a normally ineffective feed-back loop, similar to the before-mentioned prior-art feed-back loops, but differing therefrom in several critical and important details. The loop is shown comprising a conductor 9 connected with a limiter 11, which, in turn, connects through a conductor 13 to a selective network 15, and thence through an attenuator 17 and by a conductor 19 back to the input circuit 3 of the amplifier 1. When a switch S in conductor 19 is closed, this feed-back circuit becomes effective. The gain control 21 of the amplifier 1 is adjusted until the feed-back loop causes the amplifier system 1 to break into oscillation. Through the use of the appropriately tuned selective network 15 in the feed-back loop, it is insured that oscillation takes place at a predetermined frequency within the flat response or constant-gain band of frequencies which the amplifier 1 is designed to amplify, and not near the end regions thereof, as in the before-mentioned prior-art feed-back systems. It is therefore insured that the point of oscillation occurs at a frequency at which the amplifier 1 has its intended substantially constant gain. A true standardized measurement of the gain of the amplifier is thus obtained, as again contrasted with measurements obtained near the end or roll-off regions of the amplifier frequency response, where the gain is different from the gain of the amplifier in the desired constant-gain spectrum region.

The before-mentioned limiter 11 serves to distort the portion of the output signal fed thereto, by conductor 9, which distortion may be corrected in the selective network 15, so that the wave-form fed back to the amplifier 1 is substantially purely sinusoidal. Through the proper design of the selective network 15, therefore, the wave form of the output of the oscillating system may be maintained substantially a pure sinusoidal wave in order to assist, as before explained, in providing a measurement in the indicator 7 that enables accurate standardization of an associated piece of apparatus, such as a wave analyzer, requiring standardizing substantially pure sine waves. Unless such limiting is employed, the amplifier 1 itself might distort in building up oscillations, and thereby provide a non-sinusoidal output. The limiter 11 also performs other important functions. The amplifier 1, particularly if it is a proper amplifier, will continue to build up the amplitude of oscillations once the oscillating condition is reached. This will, in turn, generally drive the indicator 7, such as a meter and the like, off scale. The limiter 11, however, prevents such an undesirable build-up, limiting the amplitude of the oscillation to predetermined positive and negative-cycle values, and limiting the effective swing or indication of the meter or other indicator 7 within desired limits.

This limiting system also provides a measure of stability in the rendering of the amplifying system oscillatory at a predetermined frequency, as compared with the rather touchy and critical nature of the prior-art feed-back systems, wherein the systems rather spuriously are set into oscillation at frequencies near the ends of the amplifier band.

The limiter 11, moreover, serves, also, to maintain the amplifier 1 in its linear operating region irrespective of whether it is performing its normal amplifying function or its oscillating calibration function; whereas, in the prior-art feed-back systems, as before described, the amplifier will operate at different levels, depending upon whether it is in its amplifying or oscillating state. There will thus be a different level when the amplifier goes into the transition between amplifying and oscillating, and another level when it switches back from the oscillating state to the amplifying state. This difference in level is obviated through the use of this limiter 11 in the feed-back path.

Once the gain control 21 has been adjusted to set the system 1 into oscillation, the actual loss in the feedback path, which is equal to the gain of the amplifying system 1, will be controlled through the variable attenuating device 17. This device is pre-set in accordance with the characteristics of the input microphone or other pick-up device in order to provide a certain preselected loss matched to the intended gain of the amplifier 1, as used with that particular microphone or pick-up device.

Referring now to the circuit diagram of FIG. 2, the amplifier 1 is provided with a potentiometer 21, corresponding to the gain control 21 of FIG. 1, and feeding, in turn, through a coupling capacitor C to the base 2 of the last amplifier stage 1', shown as a transistor-type emitter-follower stage. The emitter 4 of the transistor stage 1' is shown connected through resistor load 6 and a source of potential 8, to the lower terminal of the potentiometer 21. The collector 10 is shown grounded at 12. Across the load 6 and source 8, is connected the indicator 7, illustrated in the form of a meter. The emitter 4 is also connected by conductor 9 through resistor R1 and R2, to the limiter reversely poled diodes 11. The circuit then continues by way of conductors 13 through the selective network 15, shown comprising a first low-pass section constituted of series resistor R3 and shunt capacitor C1; a second high-pass section constituted of series capacitor C2 and shunt resistor R4; a third low-pass section constituted of series resistor R5 and shunt capacitor C3; and a terminal high-pass filter section, constituted of series capacitor C4 and at least part of the potentiometer 17. These successive low-pass and high-pass networks serve to provide a selective filter network that predetermines the frequency at which the oscillation of the system 1 will take place, and this, as before stated, is adjusted to a predetermined frequency in the flat region or constant-gain band of the amplifier 1. This type of network also corrects the distortion introduced into the waveform by the limiting action of the limiter 11, thus to produce a substantially sinusoidal wave form. The potentiometer 17 serves, also, as the before-mentioned attenuator, the slider 23 of which connects by conductor 19 through the switch S back to the upper of the input conductors 3.

In the system of FIG. 2, the phase at the input 3 and output of the amplifier stages 1, 1' is the same. It has been found that in amplifier systems where a phase reversal occurs, a slightly different type of selective network arrangement may be desirable. Thus, in FIG. 3, the network 15 comprises capacitor C5 and resistor R6, acting as an input high-pass filter; and a twin T-type network, comprising series resistors R7 and R8 shunted by series-connected capacitors C6 and C7 and having an intermediate capacitor-resistor branch C8–R9 connected between the points of series connection of the resistors R7 and R8 and the capacitors C6 and C7. The junction of capacitor C8 and resistor R9 is shown grounded and the limiter diodes 11 are illustrated as connected between ground and the point of series connection of the resistors R7 and R8, through resistor R2. It is well known, of course, that a twin-T network, if properly balanced, provides a rejection-type of response; but, if unbalanced, it can serve as a band-pass network system. This latter function is obtained herein by unbalancing the twin-T network through appropriate adjustment of the respective impedances of the elements of the networks and the connection of the limiter 11. This has been found, moreover, to reverse the phase of the energy being fed back so that the phase of the sine wave passing through the terminal low-pass section R9–C9 is reverse to that appearing at the output of the amplifier 1. This type of feed-back network may, therefore, be employed with amplifiers the input and output of which contain out-of-phase signals.

Further modifications will occur to those skilled in the art, and all such are considered to fall within the spirit and scope of the invention, as defined in the appended claims.

What is claimed is:

1. In combination with an amplifier system having an input and an output and adapted to respond with substantially constant gain over a predetermined band of frequencies, pick-up means for applying an external signal to said input, and indicator means connected to said output; means for calibrating the gain of the amplifier system to a predetermined value related to the characteristics of the pick-up means, comprising a normally ineffective feedback path connected between the output and the input of the amplifier system and including frequency-selective means for enabling the feeding back between the output and input, when the path is rendered effective, of a predetermined frequency within the said predetermined band of frequencies, including means for providing a preselected attenuation in said feedback path related to the characteristics of the pick-up means, and including means for rendering the feedback path effective, said calibrating means further comprising gain-control means disposed between the input and the output of the amplifier system and in the path from said pick-up means through said amplifier system to said indicator means for adjusting the gain of the amplifier system until the system breaks into oscillation at the said predetermined frequency, the said gain-control means being adjusted to a degree such that the gain of the amplifier system corresponds to the attenuation in the feedback path, whereby when said feedback path is again rendered ineffective the gain of the amplifier system between said pick-up means and said indicator means will remain at its calibrated value for signals passed from said pick-up means through said amplifier system to said indicator means.

2. The combination of claim 1 and in which said means for providing a preselected attenuation in said feedback path comprises variable attenuating means.

3. The combination of claim 1 and in which limiting means is provided in the feedback path between the amplifier system output and the frequency selective means.

4. The combination of claim 3 and in which the frequency selective means is adjusted to compensate for distortion introduced by the limiting means, thereby to provide a substantially sinusoidal wave form for feeding back to the input of the amplifier system.

5. The combination of claim 4 and in which the frequency selective means comprises successive low and high pass filters.

6. The combination of claim 3 and in which the limiting means comprises a pair of oppositely poled diodes connected with the frequency selective means.

7. The combination of claim 1 and in which an unbalanced twin-T network is provided in said feedback path to invert the phase of the energy fed back between the output and input of the amplifier system.

8. The combination of claim 1 and in which said amplifier system is a sound level amplifier system having a transistor emitter follower output stage.

References Cited in the file of this patent

UNITED STATES PATENTS

| | | |
|---|---|---|
| 2,322,708 | Burger | June 22, 1943 |
| 2,564,010 | Jacobs | Aug. 14, 1951 |
| 2,587,697 | Conrad | Mar. 4, 1952 |
| 2,647,958 | Barney | Aug. 4, 1953 |
| 2,764,643 | Sulzer | Sept. 25, 1956 |

FOREIGN PATENTS

| | | |
|---|---|---|
| 139,670 | Australia | Dec. 11, 1950 |
| 879,844 | Germany | June 15, 1953 |

OTHER REFERENCES

Smith: "The Characteristics of Parallel-T RC Networks," Electronic Engineering, February 1957, pages 71–77.